United States Patent
Yoon et al.

(10) Patent No.: US 11,435,842 B2
(45) Date of Patent: Sep. 6, 2022

(54) TOUCH DISPLAY DEVICE AND METHOD OF FABRICATING THE SAME

(71) Applicant: LG Display Co., Ltd., Seoul (KR)

(72) Inventors: Sang-Soon Yoon, Paju-si (KR);
You-Hyun Eom, Goyang-si (KR);
Song-Yi Jeong, Ansan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 188 days.

(21) Appl. No.: 15/981,569

(22) Filed: May 16, 2018

(65) Prior Publication Data
US 2018/0335882 A1 Nov. 22, 2018

(30) Foreign Application Priority Data
May 18, 2017 (KR) .................. 10-2017-0061606

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G02F 1/133514* (2013.01); *G02F 1/133528* (2013.01); *G06F 3/0445* (2019.05); *G06F 3/0446* (2019.05); *G02F 1/133357* (2021.01); *G02F 1/133548* (2021.01);
(Continued)

(58) Field of Classification Search
CPC ...... G06F 3/0412; G06F 3/044; G06F 3/0445; G06F 3/0446; G06F 3/0448; G06F 2203/04103; G02F 1/13338; G02F 1/133514; G02F 1/133548; G02F 1/133528; G02F 1/1335; G02F 1/133357;
(Continued)

(56) References Cited

U.S. PATENT DOCUMENTS 10,216,037 B2 * 2/2019 Kim .................. G02F 1/133608
10,551,676 B2 * 2/2020 Cho .................... G02F 1/13362
(Continued)

FOREIGN PATENT DOCUMENTS

CN 109683378 A * 4/2019
KR 10-2010-0111103 A 10/2010
(Continued)

OTHER PUBLICATIONS

Korean Office Action dated Apr. 6, 2021 issued in corresponding Patent Application No. 10-2017-0061606 (4 pages).

*Primary Examiner* — Temesghen Ghebretinsae
*Assistant Examiner* — Karin Kiyabu
(74) *Attorney, Agent, or Firm* — Polsinelli PC

(57) ABSTRACT

A touch display device including: first and second substrates facing and spaced apart from each other, the first and second substrates including red, green and blue sub-pixels; a polarizing layer on an outer surface of the first substrate; a pixel electrode and a common electrode in each of the red, green and blue sub-pixels on an inner surface of the first substrate; a color filter layer on an inner surface of the second substrate; a wire grid polarizing layer on the color filter layer, the wire grid polarizing layer including a plurality of bars, and a touch signal applied to the wire grid polarizing layer; a liquid crystal layer between the first and second substrates; and a backlight unit under the first substrate.

9 Claims, 8 Drawing Sheets

(51) Int. Cl.
*G02F 1/1335* (2006.01)
*G06F 3/044* (2006.01)
*G02F 1/13357* (2006.01)

(52) U.S. Cl.
CPC .... *G02F 1/133617* (2013.01); *G02F 2201/50* (2013.01); *G02F 2202/36* (2013.01); *G06F 2203/04103* (2013.01)

(58) Field of Classification Search
CPC .......... G02F 1/133617; G02F 2201/50; G02F 2202/36; G02B 5/30
See application file for complete search history.

(56) References Cited

U.S. PATENT DOCUMENTS

| | | | |
|---|---|---|---|
| 10,725,333 B2* | 7/2020 | Kim | G02F 1/133504 |
| 10,818,652 B2* | 10/2020 | Kim | H01L 27/016 |
| 11,003,014 B2* | 5/2021 | Fang | G02F 1/133617 |
| 2006/0050081 A1* | 3/2006 | Kobayashi | H01L 27/322 |
| | | | 345/597 |
| 2012/0105752 A1* | 5/2012 | Park | G02F 1/13338 |
| | | | 349/33 |
| 2014/0117324 A1* | 5/2014 | Kim | G06F 3/0443 |
| | | | 257/40 |
| 2014/0183478 A1* | 7/2014 | Lee | H01L 51/5246 |
| | | | 257/40 |
| 2015/0205159 A1* | 7/2015 | Itou | G02F 1/133514 |
| | | | 349/110 |
| 2016/0033816 A1* | 2/2016 | Yoon | G02F 1/134336 |
| | | | 349/108 |
| 2016/0091757 A1* | 3/2016 | Miki | G02F 1/133617 |
| | | | 349/42 |
| 2016/0231844 A1* | 8/2016 | Lee | G02F 1/13338 |
| 2018/0108303 A1* | 4/2018 | Park | G02F 1/23 |
| 2018/0157083 A1* | 6/2018 | Yeo | G02F 1/133514 |
| 2019/0050096 A1* | 2/2019 | Wang | H01L 51/5253 |
| 2021/0193743 A1* | 6/2021 | Kim | G06F 1/1652 |

FOREIGN PATENT DOCUMENTS

| | | |
|---|---|---|
| KR | 10-2011-0037195 A | 4/2011 |
| KR | 10-2016-0086486 A | 7/2016 |
| KR | 10-2016-0107376 A | 9/2016 |
| KR | 10-2017-0031319 A | 3/2017 |

* cited by examiner

TOUCH DISPLAY DEVICE AND METHOD OF FABRICATING THE SAME

CROSS REFERENCE TO RELATED APPLICATION

The present application claims the priority benefit of Korean Patent Application No. 10-2017-0061606 filed in Republic of Korea on May 18, 2017, which is hereby incorporated by reference in its entirety for all purposes as if fully set forth herein.

BACKGROUND

Field of the Disclosure

The present disclosure relates to a display device, and more particularly, to a touch display device including a wire grid polarizing layer functioning as a touch electrode and an in-cell polarizing plate and a method of fabricating the touch display device.

Description of the Background

As an information communication technology and an electronic engineering technology progress, various flat panel displays (FPDs) replacing the conventional cathode ray tube (CRT) have been researched. Specifically, a liquid crystal display (LCD) device, a plasma display panel (PDP) device, an organic light emitting diode (OLED) display device or a field emission display (FED) device having a thin profile, a light weight and a low power consumption as compared with the CRT has been the subject of recent research.

Recently, a touch display device (or a touch screen) where a touch panel is attached to a display panel has been widely used.

The touch display device is used as an output means displaying an image and as an input means receiving a user's order through a touch on a part of the displayed image. The touch panel of the touch display device may be classified into a pressure sensing type, a capacitive type, an infrared type and an ultrasonic type according to a detection method of position information.

When a user sees an image of the display panel and touches the touch panel, the touch panel detects the position information of the point and recognizes the user's order by comparing the detected position information with the position information of the image.

FIG. 1 is a cross-sectional view showing a touch display device according to the related art.

In FIG. 1, a touch display device 10 includes a display panel 20 displaying an image and a touch panel 60 sensing a touch.

The display panel 20 includes first and second substrates 30 and 40 facing and spaced apart from each other and a liquid crystal layer 50 between the first and second substrates 30 and 40.

The first substrate 30 includes a pixel P of red, green and blue sub-pixels SPr, SPg and SPb. A pixel electrode 32 and a common electrode 34 spaced apart from each other are formed in the red, green and blue sub-pixels SPr, SPg and SPb on an inner surface of the first substrate 30, and a first polarizing plate 36 is formed on an outer surface of the first substrate 30.

A second polarizing plate 40 is formed on an outer surface of the second substrate 40.

An electric field is generated between the pixel electrode 32 and the common electrode 34 according to an application of a voltage, and a liquid crystal molecule of the liquid crystal layer 50 is realigned by the electric field to display a gray level.

The touch panel 60 includes third and fourth substrates 70 and 76 facing and spaced apart.

A touch transmitting electrode 72 and a touch receiving electrode 74 are formed on outer and inner surfaces, respectively, of the third substrate 70.

The fourth substrate 76 is disposed to cover the third substrate 70 and to protect the touch transmitting electrode 72 and the touch receiving electrode 74.

The display panel 20 and the touch panel 60 are attached to each other with an adhesive.

The touch display device 10 displays an image using the display panel 20 and recognizes a user's order using the touch panel 60 sensing a touch.

In the touch display device 10 according to the related art, since the touch panel 60 and the display panel 20 are separately formed, a fabrication cost increases and a thickness of the touch display device 10 increases.

In addition, since the first and second polarizing plates 36 and 42 are formed on the outer surfaces of the first and second substrates 30 and 40, respectively, a fabrication process becomes complicated and a fabrication cost increases.

Further, since the first and second polarizing plates 36 and 42 are formed as an absorption type, an optical efficiency is reduced and a brightness of an image decreases.

SUMMARY

Accordingly, the present disclosure is directed to a touch display device and a method of fabricating the touch display device that substantially obviate one or more of the problems due to limitations and disadvantages of the related art.

More specifically, the present disclosure is to provide a touch display device where touch sensitivity, an optical efficiency and brightness are improved, a fabrication process is simplified and a fabrication cost is reduced by forming a wire grid polarizing layer on an inner surface of a substrate and a method of fabricating the touch display device.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a touch display device including: first and second substrates facing and spaced apart from each other, the first and second substrates including red, green and blue sub-pixels; a polarizing layer on an outer surface of the first substrate; a pixel electrode and a common electrode in each of the red, green and blue sub-pixels on an inner surface of the first substrate; a color filter layer on an inner surface of the second substrate; a wire grid polarizing layer on the color filter layer, the wire grid polarizing layer including a plurality of bars, and a touch signal applied to the wire grid polarizing layer; a liquid crystal layer between the first and second substrates; and a backlight unit under the first substrate.

In another aspect, a method of fabricating a touch display device including: forming a pixel electrode and a common electrode in each of red, green and blue sub-pixels on a first substrate; forming a color filter layer on a second substrate; forming a wire grid polarizing layer on the color filter layer, the wire grid polarizing layer including a plurality of bars and a touch signal applied to the wire grid polarizing layer; attaching the first and second substrates; forming a liquid crystal layer between the first and second substrates; forming a polarizing layer on an outer surface of the first substrate; and disposing a backlight unit under the first substrate.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principles of the disclosure.

In the drawings.

DETAILED DESCRIPTION

Reference will now be made in detail to the present disclosure, examples of which are illustrated in the accompanying drawings. Whenever possible, the same reference numbers will be used throughout the drawings to refer to the same or like parts.

Figure 1:
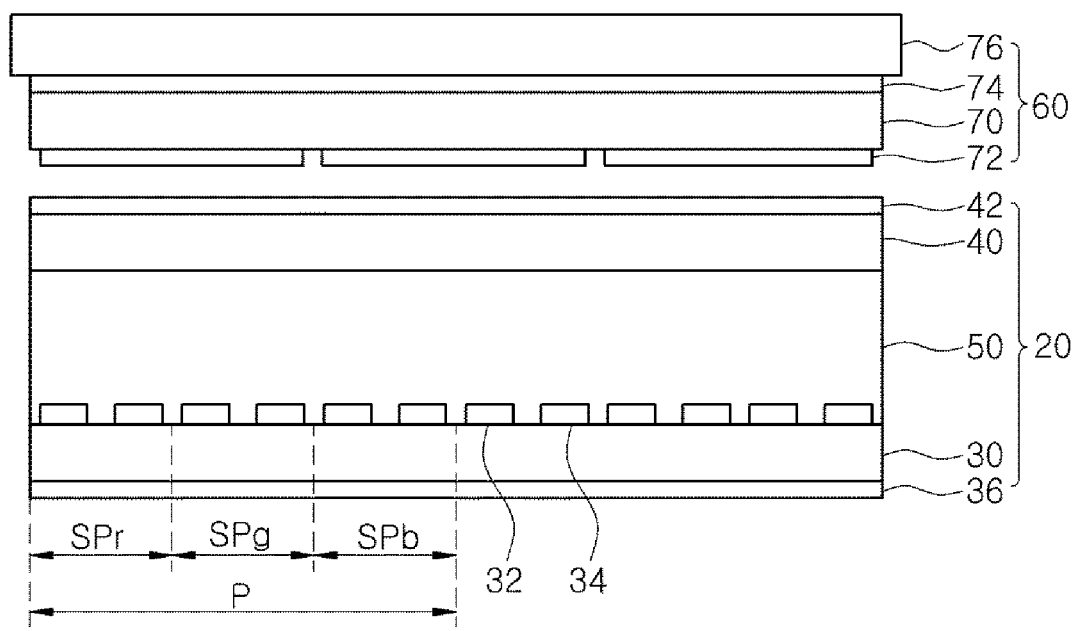
FIG. 1 is a cross-sectional view showing a touch display device according to the related art.
Figure 2:
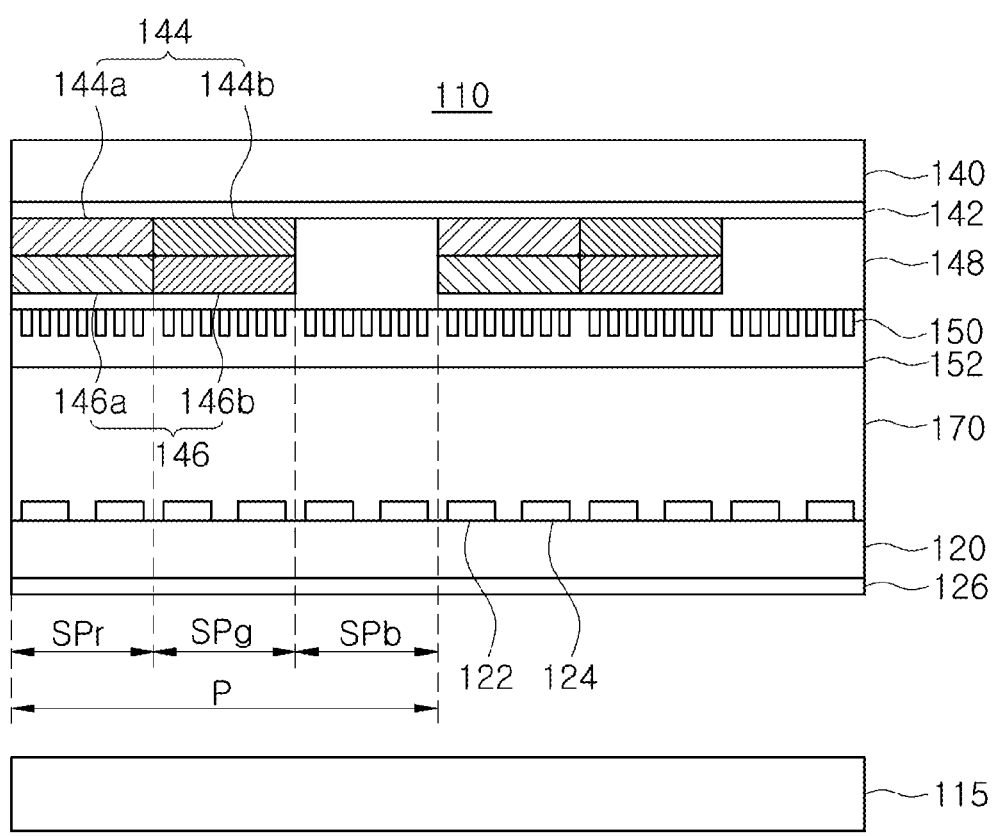
FIG. 2 is a cross-sectional view showing a touch display device according to a first aspect of the present disclosure.
Figure 3:
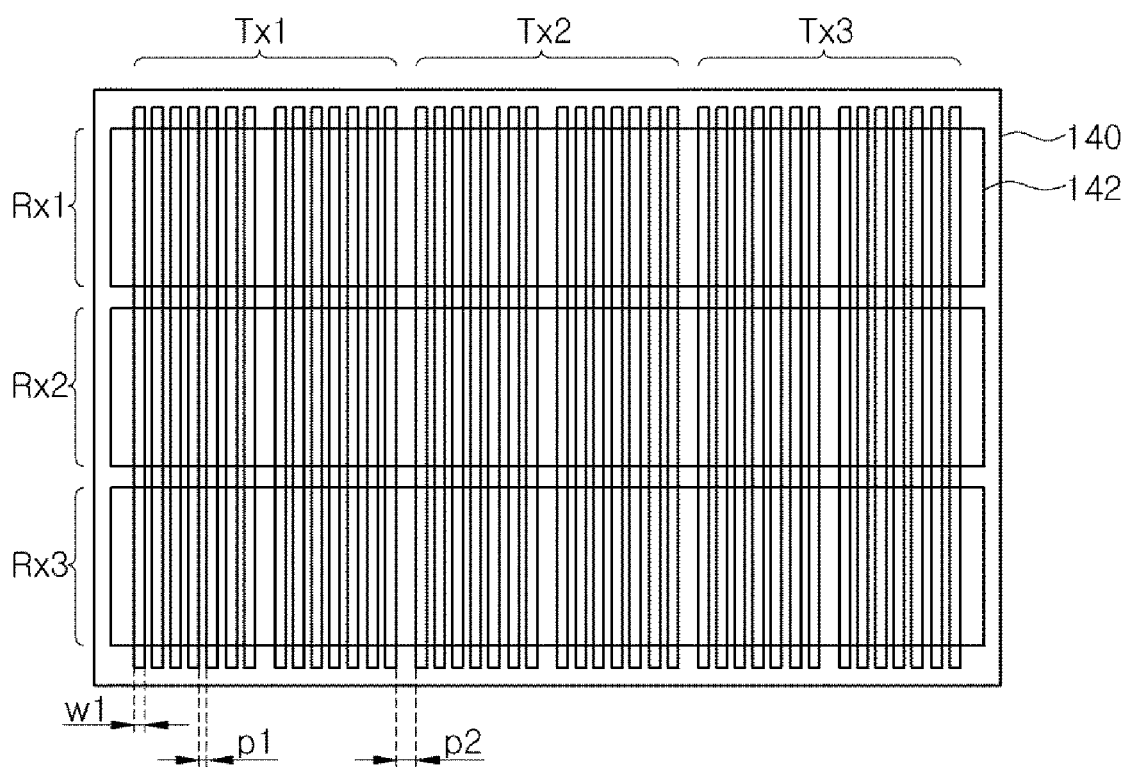
FIG. 3 is a plan view showing a second substrate of a touch display device according to a first aspect of the present disclosure.

FIG. 2 is a cross-sectional view showing a touch display device according to a first aspect of the present disclosure, and FIG. 3 is a plan view showing a second substrate of a touch display device according to the first aspect of the present disclosure.

In FIGS. 2 and 3, a touch display device 110 includes first and second substrates 120 and 140 facing and spaced apart from each other and a liquid crystal layer 170 between the first and second substrates 120 and 140.

The first substrate 120 includes a pixel P of red, green and blue sub-pixels SPr, SPg and SPb. A pixel electrode 122 and a common electrode 124 spaced apart from each other are formed in each of the red, green and blue sub-pixels SPr, SPg and SPb on an inner surface of the first substrate 120, and a polarizing plate 126 is formed on an outer surface of the first substrate 120.

Although not shown, a gate line and a data line may be formed on the inner surface of the first substrate 120. The gate line and the data line cross each other to define the red, green and blue sub-pixels SPr, SPg and SPb. A thin film transistor connected to the gate line and the data line may be formed in each of the red, green and blue sub-pixels SPr, SPg and SPb. The pixel electrode 122 may be connected to the thin film transistor.

Although the pixel electrode 122 and the common electrode 124 have the same layer and the same material as each other in the first aspect, the pixel electrode and the common electrode may be disposed as different layers with an insulating layer therebetween in another aspect.

A touch receiving electrode 142 is formed on an inner surface of the second substrate 140 and includes a plurality of bars parallel to and spaced apart from each other.

The touch receiving electrode 142 may be defined as first to third receiving electrodes Rx1 to Rx3. A touch receiving signal is transmitted to each of the first to third receiving electrodes Rx1 to Rx3. Each of the first to third receiving electrodes Rx1 to Rx3 may have a width corresponding to at least one sub-pixel and may include a transparent conductive material such as indium tin oxide (ITO) and indium zinc oxide (IZO).

A color filter layer 144 is formed on the touch receiving electrode 142, and a color changing layer 146 is formed on the color filter layer 144. The color filter layer 144 includes red and green color filter patterns 144a and 144b in the red and green sub-pixels SPr and SPg, respectively. The color changing layer 146 includes red and green color changing patterns 146a and 146b in the red and green sub-pixels, respectively.

The red color filter pattern 144a transmits a red-colored light and blocks a light of different colors. The green color filter pattern 144b transmits a green colored light and blocks a light of different colors.

The red color changing pattern 146a converts a color (a wavelength) of a blue-colored light incident from a lower portion and emits a red-colored light. The green color changing pattern 146b converts a color (a wavelength) of a blue-colored light incident from a lower portion and emits a green-colored light.

For example, the red color changing pattern 146a may convert a blue-colored light having a wavelength of about 430 nm to about 470 nm into a red-colored light having a wavelength of about 650 nm to about 680 nm to emit the red-colored light. The green color changing pattern 146b may convert a blue-colored light having a wavelength of about 430 nm to about 470 nm into a green-colored light having a wavelength of about 540 nm to about 560 nm to emit the green-colored light.

The color changing layer 146 may include a color changing material. For example, the color changing material may include a fluorescent material having a relatively high quantum efficiency such as an organic light emitting material or a quantum dot.

The red color changing pattern 146a may include a red fluorescent material such as (Ca, Sr, Ba)S, (Ca, Sr, Ba)$_2$Si$_5$N$_8$, CASN (CaAlSiN$_3$), CaMoO$_4$ and Eu$_2$Si$_5$N$_8$ or a quantum dot such as II-VI compound, IV-VI compound, IV element, IV compound and a combination thereof.

The green color changing pattern 146b may include a green fluorescent material such as yttrium aluminum garnet (YAG), (Ca, Sr, Ba)$_2$SiO$_4$, SrGa$_2$S$_4$, BAM, α-SiAlON, β-SiAlON, $Ca_3Sc_2Si_3O_{12}$, $Tb_3Al_5O_{12}$, $BaSiO_4$, CaAlSiON, $(Sr_{1-x}Ba_x)Si_2O_2N_2$ or a quantum dot such as II-VI compound, IV-VI compound, IV element, IV compound and a combination thereof.

The II-VI compound may be selected from a group including a di-element compound including one of CdSe, CdTe, ZnS, ZnSe, ZnTe, ZnO, HgS, HgSe, HgTe, MgSe, MgS and a mixture thereof; a tri-element compound including one of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and a mixture thereof; and a tetra-element compound including one of HgZnTeS, CdZnSeS, CdZnSeTe, CdZnSTe, CdHgSeS, CdHgSeTe, CdHgSTe, HgZnSeS, HgZnSeTe, HgZnSTe and a mixture thereof.

The III-V compound may be selected from a group including a di-element compound including one of GaN, GaP, GaAs, GaSb, AN, AlP, AlAs, AlSb, InN, InP, InAs, InSb and a mixture thereof; a tri-element compound including one of GaNP, GaNAs, GaNSb, GaPAs, GaPSb, AlNP, AlNAs, AlNSb, AlPAs, AlPSb, InNP, InNAs, InNSb, InPAs, InPSb, GaAlNP and a mixture thereof; and a tetra-element including one of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and a mixture thereof.

The IV-VI compound may be selected from a group including a di-element compound including one of SnS, SnSe, SnTe, PbS, PbSe, PbTe and a mixture thereof; a tri-element compound including one of SnSeS, SnSeTe, SnSTe, PbSeS, PbSeTe, PbSTe, SnPbS, SnPbSe, SnPbTe and a mixture thereof; and a tetra-element compound including one of SnPbSSe, SnPbSeTe, SnPbSTe and a mixture thereof.

The IV element may be selected from a group including Si, Ge and a mixture thereof.

The IV compound may include a di-element compound selected from a group including SiC, SiGe and a mixture thereof.

The di-element compound, the tri-element compound and the tetra-element compound may exist in a particle with a uniform concentration or may exist in a particle with a state where a concentration distribution is partially different.

In addition, the di-element compound, the tri-element compound and the tetra-element compound may have a core/shell structure where one quantum dot surrounds another quantum dot, and an interface between the core and the shell may have a concentration gradient where a concentration gradually decreases from an outer portion to a central portion.

The quantum dot may have one of a sphere shape, a pyramid shape, a nano particle of a multi-arm shape or a cubic shape, a nano tube, a nano wire, a nano fiber and a nano platy particle.

A planarizing layer 148 is formed on the color changing layer 146. Since the planarizing layer 148 is formed on the touch receiving electrode 142 in the blue sub-pixel SPb to fill a space between the red and green color changing patterns 146a and 146b, a step difference due to the red and green color changing patterns 146a and 146b is removed and the color changing layer 146 is planarized.

The planarizing layer 148 may include a transparent polymer having a plurality of voids or a plurality of transparent beads to improve a viewing angle by diffusing the green-colored light.

In the first aspect, the color filter pattern and the color changing pattern are not formed in the blue sub-pixel SPb on the inner surface of the second substrate 140 and the planarization layer 148 is formed in the blue sub-pixel SPb on the inner surface of the second substrate 140. In another aspect, the blue color filter pattern and the blue color changing pattern may be formed in the blue sub-pixel SPb on the inner surface of the second substrate 140 and the planarization layer 148 may be omitted in the blue sub-pixel SPb on the inner surface of the second substrate 140.

A wire grid polarizing layer 150 is formed on the planarizing layer 148. The wire grid polarizing layer 150 may include a plurality of bars parallel to and spaced apart from each other and may include a metallic material such as aluminum (Al), molybdenum (Mo) and tungsten (W).

Specifically, each bar may have a first width w1 and the two adjacent bars may be spaced apart from each other by a first pitch p1. For example, each of the first width w1 and the first pitch p1 may be within a range of about 0.01 µm to about 0.1 µm, and the first width w1 and the first pitch p1 may have the same value.

The wire grid polarizing layer 150 has a shape such that a metal layer is formed in one half of a unit area and the metal layer is not formed in the other half of the unit area. Since a capacitance of the wire grid planarizing layer 150 is similar to a capacitance of a metal layer in the entire unit area, measurement of a capacitance for sensing a touch may be properly performed.

For example, first and second cases may be compared. In the first case, a metal pattern is formed in the entire unit area of about 10 µm× about 10 µm and a dielectric layer having a dielectric constant of about 3.4 and a thickness of about 4 µm is formed on the metal pattern. In the second case, a metal pattern having a plurality of bars having a width of about 0.05 µm and a thickness of about 0.05 µm is formed in a half of a unit area of about 10 µm× about 10 µm and a dielectric layer having a dielectric constant of about 3.4 and a thickness of about 4 µm is formed on the metal pattern. When a finger contacts the dielectric layer, capacitances of about 0.00075261 pF and about 0.00075222 pF may be measured from the first and second cases, respectively. Since the capacitance of the second case where the metal pattern of the plurality of bars is formed in a half of the unit area is about 99.95% of the capacitance of the first case where the metal pattern is formed in the entire unit area, a touch may be sensed accurately.

In addition, third and fourth cases may be compared. In the third case, a metal pattern is formed in the entire unit area of about 5.7 µm× about 5.7 µm and a dielectric layer having a dielectric constant of about 3.4 and a thickness of about 4 µm and a glass having a thickness of about 500 µm are sequentially formed on the metal pattern. In the fourth case, a metal pattern having a plurality of bars having a width of about 0.05 µm and a thickness of about 0.05 µm is formed in a half of a unit area of about 5.7 µm×5.7 µm and a dielectric layer having a dielectric constant of about 3.4 and a thickness of about 4 µm and a glass having a thickness of about 500 µm are sequentially formed on the metal pattern. When a finger contacts the glass, capacitances of about 3.0862 pF and about 3.0847 pF may be measured from the third and fourth cases, respectively. Since the capacitance of the fourth case where the metal pattern of the plurality of bars is formed in a half of the unit area is about 99.95% of the capacitance of the first case where the metal pattern is formed in the entire unit area, a touch may be sensed accurately.

The plurality of bars of the wire grid polarizing layer 150 may be defined as a plurality of groups each including a plurality of bars, and the adjacent groups may be spaced apart from each other by a second pitch p2 greater than the first pitch p1.

The plurality of groups of the wire grid polarizing layer 150 may be defined as first to third transmitting electrodes Tx1 to Tx3 each transmitting a touch transmitting signal. Each of the first to third transmitting electrodes Tx1 to Tx3 may have a width corresponding to at least one sub-pixel. The first to third transmitting electrodes Tx1 to Tx3 may be disposed to cross the first to third receiving electrodes Rx1 to Rx3 of the touch receiving electrode 142.

The wire grid polarizing layer 150 reflects a component (S polarization) of an incident light parallel to a long axis of the plurality of bars and transmits a component (P polarization) of the incident light perpendicular to the long axis of the plurality of bars.

As a result, the wire grid polarizing layer 150 functions as a reflective polarizing element which divides polarization components due to reflection and transmission. Since a reflected light is recycled, a light efficiency increases and a brightness of an image increases.

An overcoat layer 152 is formed on the entire wire grid polarizing layer 150. The overcoat layer 152 may include an organic insulating material such as photoacryl. The overcoat layer 152 may cover the wire grid polarizing layer 150 to protect and planarize the wire grid polarizing layer 150.

A backlight unit 115 supplying a blue-colored light to the touch display panel including the first and second substrates 120 and 140 and the liquid crystal layer 170 is disposed under the first substrate 120. This listing of claims will replace all prior versions, and listings, of claims in the application.

Although the backlight unit 115 supplies the blue-colored light in the first aspect, a backlight unit 115 may supply a white-colored light and a blue color filter pattern may be formed in the blue sub-pixel SPb on the inner surface of the second substrate 140 in another aspect. When the backlight unit 115 supplying the white-colored light is used, the color changing layer 146 may be omitted.

The touch display device 110 displays an image by realigning the liquid crystal molecule (not shown) of the liquid crystal layer 170 using the electric field generated between the pixel electrode 122 and the common electrode 124.

In addition, the touch display device 110 senses a touch by applying the touch transmitting signal to the first to third transmitting electrodes Tx1 to Tx3 of the wire grid polarizing layer 150 and by detecting a capacitance change between the first to third transmitting electrodes Tx1 to Tx3 and the first to third receiving electrodes Rx1 to Rx3 due to a touch as the touch receiving signal from the first to third receiving electrodes Rx1 to Rx3 of the touch receiving electrode 142.

The touch display device 110 has an in-cell touch type where a touch is sensed using the touch receiving electrode 142 and the wire grid polarizing layer 150 functioning as the touch transmitting electrode on the inner surface of the second substrate 140 adjacent to the touch position. As a result, touch sensitivity is improved, a fabrication cost decreases, and a thickness of the touch display device 110 is reduced.

In addition, since the wire grid polarizing layer 150 on the inner surface of the second substrate 140 has an in-cell polarizing plate type, a fabrication process is simplified and a fabrication cost is reduced.

Further, since the wire grid polarizing layer 150 on the inner surface of the second substrate 140 has a reflective polarizing plate type, an optical efficiency increases and a brightness of an image increases.

In another aspect, a touch may be sensed using a common line on an inner surface of a first substrate.

Figure 4:
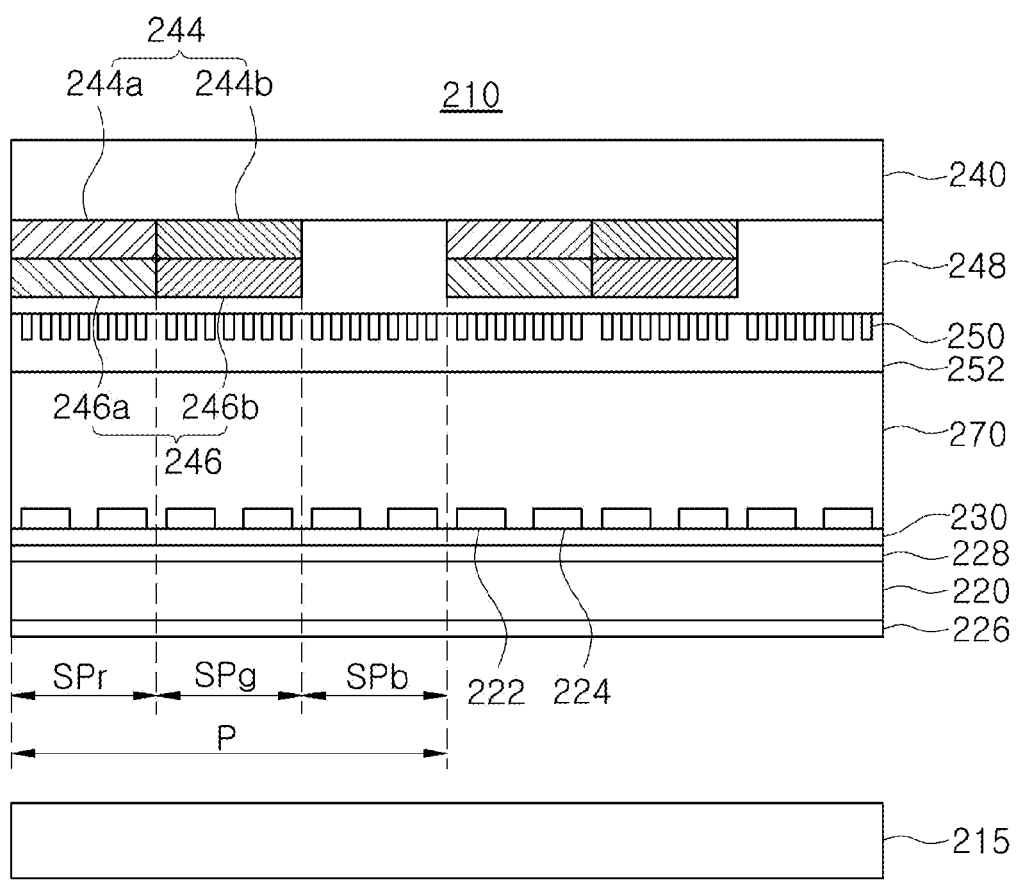
FIG. 4 is a cross-sectional view showing a touch display device according to a second aspect of the present disclosure.

FIG. 4 is a cross-sectional view showing a touch display device according to a second aspect of the present disclosure. Illustration for a part of the second aspect the same as that of the second aspect may be omitted.

In FIG. 4, a touch display device 210 includes first and second substrates 220 and 240 facing and spaced apart from each other and a liquid crystal layer 270 between the first and second substrates 220 and 240.

The first substrate 220 includes a pixel P of red, green and blue sub-pixels SPr, SPg and SPb. A common line 228 including a plurality of bars parallel to and spaced apart from each other is formed in each of the red, green and blue sub-pixels SPr, SPg and SPb on an inner surface of the first substrate 220, and a passivation layer 230 is formed on the common line 228.

The common line 228 may be defined as first to third receiving electrodes (as shown in FIG. 3). Each of the first to third receiving electrodes may have a width corresponding to at least one sub-pixel and may include a transparent conductive material such as indium tin oxide (ITO) and indium zinc oxide (IZO).

A pixel electrode 222 and a common electrode 224 spaced apart from each other are formed in each of the red, green and blue sub-pixels SPr, SPg and SPb on the passivation layer 230, and a polarizing plate 226 is formed on an outer surface of the first substrate 220.

Although not shown, a gate line and a data line may be formed on the inner surface of the first substrate 220. The gate line and the data line cross each other to define the red, green and blue sub-pixels SPr, SPg and SPb. A thin film transistor connected to the gate line and the data line may be formed in each of the red, green and blue sub-pixels SPr, SPg and SPb. The passivation layer 230 may be formed on the thin film transistor.

The pixel electrode 222 may be connected to the thin film transistor and the common electrode 224 may be connected to the common line 228.

Although the common line 228 and the common electrode 224 are disposed as different layers in the second aspect, the common line 228 and the common electrode 224 may have the same layer and the same material as each other and the common electrode 224 may be used as the touch receiving electrode in another aspect.

Although the pixel electrode 222 and the common electrode 224 have the same layer and the same material as each other in the second aspect, the pixel electrode and the common electrode may be disposed as different layers with an insulating layer therebetween in another aspect.

A color filter layer 244 is formed on an inner surface of the second substrate 240, and a color changing layer 246 is formed on the color filter layer 244. The color filter layer 244 includes red and green color filter patterns 244a and 244b in the red and green sub-pixels SPr and SPg, respectively. The color changing layer 246 includes red and green color changing patterns 246a and 246b in the red and green sub-pixels, respectively.

The red color filter pattern 244a transmits a red-colored light and blocks a light of different colors. The green color filter pattern 244b transmits a green colored light and blocks a light of different colors.

The red color changing pattern 246a converts a color (a wavelength) of a blue-colored light incident from a lower portion and emits a red-colored light. The green color changing pattern 246b converts a color (a wavelength) of a blue-colored light incident from a lower portion and emits a green-colored light.

For example, the red color changing pattern 246a may convert a blue-colored light having a wavelength of about 430 nm to about 470 nm into a red-colored light having a wavelength of about 650 nm to about 680 nm to emit the red-colored light. The green color changing pattern 246b may convert a blue-colored light having a wavelength of about 430 nm to about 470 nm into a green-colored light having a wavelength of about 540 nm to about 560 nm to emit the green-colored light.

The color changing layer 246 may include a color changing material. For example, the color changing material may include a fluorescent material having a relatively high quantum efficiency such as an organic light emitting material or a quantum dot.

A planarizing layer 248 is formed on the color changing layer 246. Since the planarizing layer 248 is formed in the blue sub-pixel SPb on the inner surface of the second substrate 240 to fill a space between the red and green color changing patterns 246a and 246b, a step difference due to the red and green color changing patterns 246a and 246b is removed and the color changing layer 246 is planarized.

The planarizing layer 248 may include a transparent polymer having a plurality of voids or a plurality of transparent beads to improve a viewing angle by diffusing the green-colored light.

In the second aspect, the color filter pattern and the color changing pattern are not formed in the blue sub-pixel SPb on the inner surface of the second substrate 240 and the planarization layer 248 is formed in the blue sub-pixel SPb on the inner surface of the second substrate 240. In another aspect, the blue color filter pattern and the blue color changing pattern may be formed in the blue sub-pixel SPb on the inner surface of the second substrate 240 and the planarization layer 248 may be omitted in the blue sub-pixel SPb on the inner surface of the second substrate 240.

A wire grid polarizing layer 250 is formed on the planarizing layer 248. The wire grid polarizing layer 250 may include a plurality of bars parallel to and spaced apart from each other and may include a metallic material such as aluminum (Al), molybdenum (Mo) and tungsten (W).

Specifically, each bar may have a first width (w1 of FIG. 3) and the two adjacent bars may be spaced apart from each other by a first pitch (p1 of FIG. 3). For example, each of the first width and the first pitch may be within a range of about 0.01 μm to about 0.1 μm, and the first width and the first pitch may have the same value as each other.

The plurality of bars of the wire grid polarizing layer 250 may be defined as a plurality of groups each including a plurality of bars, and the adjacent groups may be spaced apart from each other by a second pitch (p2 of FIG. 3) greater than the first pitch.

The plurality of groups of the wire grid polarizing layer 250 may be defined as first to third transmitting electrodes (Tx1 to Tx3 of FIG. 3) each transmitting a touch transmitting signal. Each of the first to third transmitting electrodes may have a width corresponding to at least one sub-pixel. The first to third transmitting electrodes may be disposed to cross the first to third receiving electrodes (Rx1 to Rx3 of FIG. 3) of the common line 228.

The wire grid polarizing layer 250 reflects a component (S polarization) of an incident light parallel to a long axis of the plurality of bars and transmits a component (P polarization) of the incident light perpendicular to the long axis of the plurality of bars.

As a result, the wire grid polarizing layer 250 functions as a reflective polarizing element which divides polarization components due to reflection and transmission. Since a reflected light is recycled, a light efficiency increases and a brightness of an image increases.

An overcoat layer 252 is formed on the entire wire grid polarizing layer 250. The overcoat layer 252 may include an organic insulating material such as photoacryl. The overcoat layer 252 may cover the wire grid polarizing layer 250 to protect and planarize the wire grid polarizing layer 250.

A backlight unit 215 supplying a blue-colored light to the touch display panel including the first and second substrates 220 and 240 and the liquid crystal layer 270 is disposed under the first substrate 220.

Although the backlight unit 215 supplies the blue-colored light in the second aspect, a backlight unit 215 may supply a white-colored light and a blue color filter pattern may be formed in the blue sub-pixel SPb on the inner surface of the second substrate 240 in another aspect. When the backlight unit 215 supplying the white-colored light is used, the color changing layer 246 may be omitted.

The touch display device 210 displays an image by realigning the liquid crystal molecule (not shown) of the liquid crystal layer 270 using the electric field generated between the pixel electrode 222 and the common electrode 224.

In addition, the touch display device 210 senses a touch by applying the touch transmitting signal to the first to third transmitting electrodes Tx1 to Tx3 of the wire grid polarizing layer 250 and by detecting a capacitance change between the first to third transmitting electrodes Tx1 to Tx3 and the first to third receiving electrodes Rx1 to Rx3 due to a touch as the touch receiving signal from the first to third receiving electrodes Rx1 to Rx3 of the common line 228.

The touch display device 210 has an in-cell touch type where a touch is sensed using the common line 228 functioning as the touch receiving electrode on the inner surface of the first substrate 220 and the wire grid polarizing layer 250 functioning as the touch transmitting electrode on the inner surface of the second substrate 240 adjacent to the touch position. As a result, touch sensitivity is improved, a fabrication cost decreases, and a thickness of the touch display device 210 is reduced.

In addition, since the wire grid polarizing layer 250 on the inner surface of the second substrate 240 has an in-cell polarizing plate type, a fabrication process is simplified and a fabrication cost is reduced.

Further, since the wire grid polarizing layer 250 on the inner surface of the second substrate 240 has a reflective polarizing plate type, an optical efficiency increases and a brightness of an image increases.

Moreover, since the common line or the common electrode transmitting a common voltage for displaying an image is used as the touch receiving electrode, a fabrication process is further simplified and a fabrication cost is further reduced.

In another aspect, a wire grid polarizing plate on an inner surface of a second substrate is divided into groups having a rectangular shape and a touch display device has a mutual capacitance type.

Figure 5:
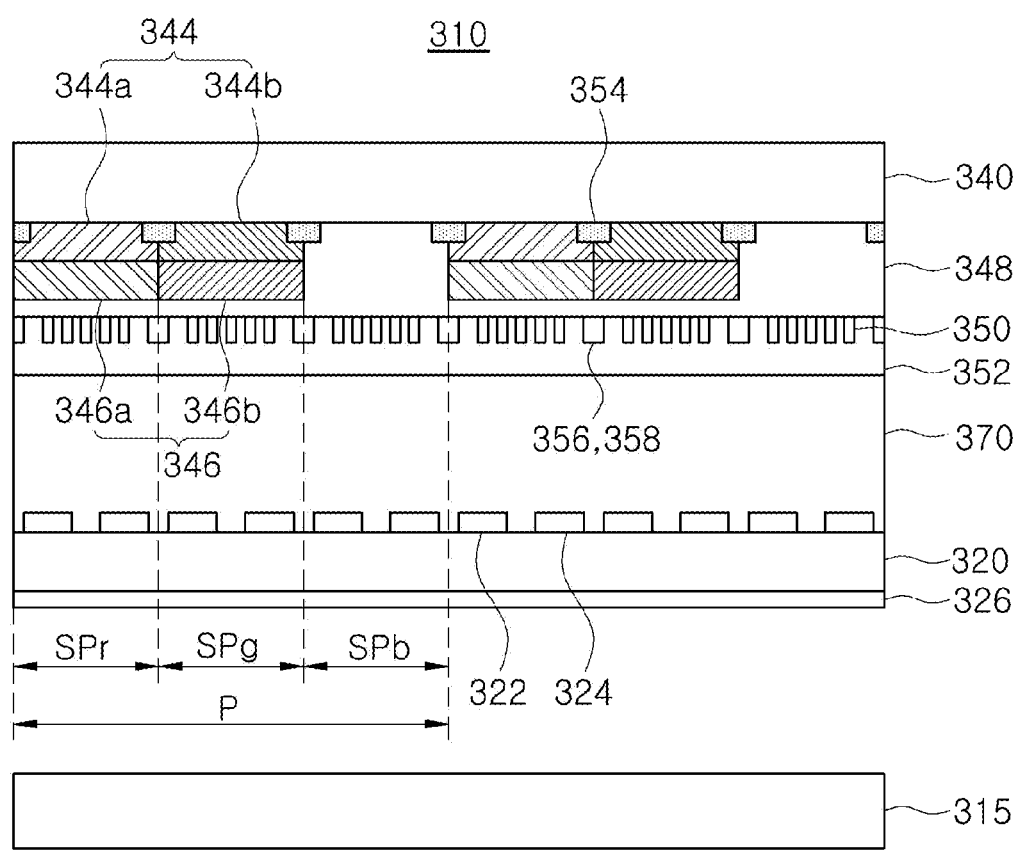
FIG. 5 is a cross-sectional view showing a touch display device according to a third aspect of the present disclosure.
Figure 6:
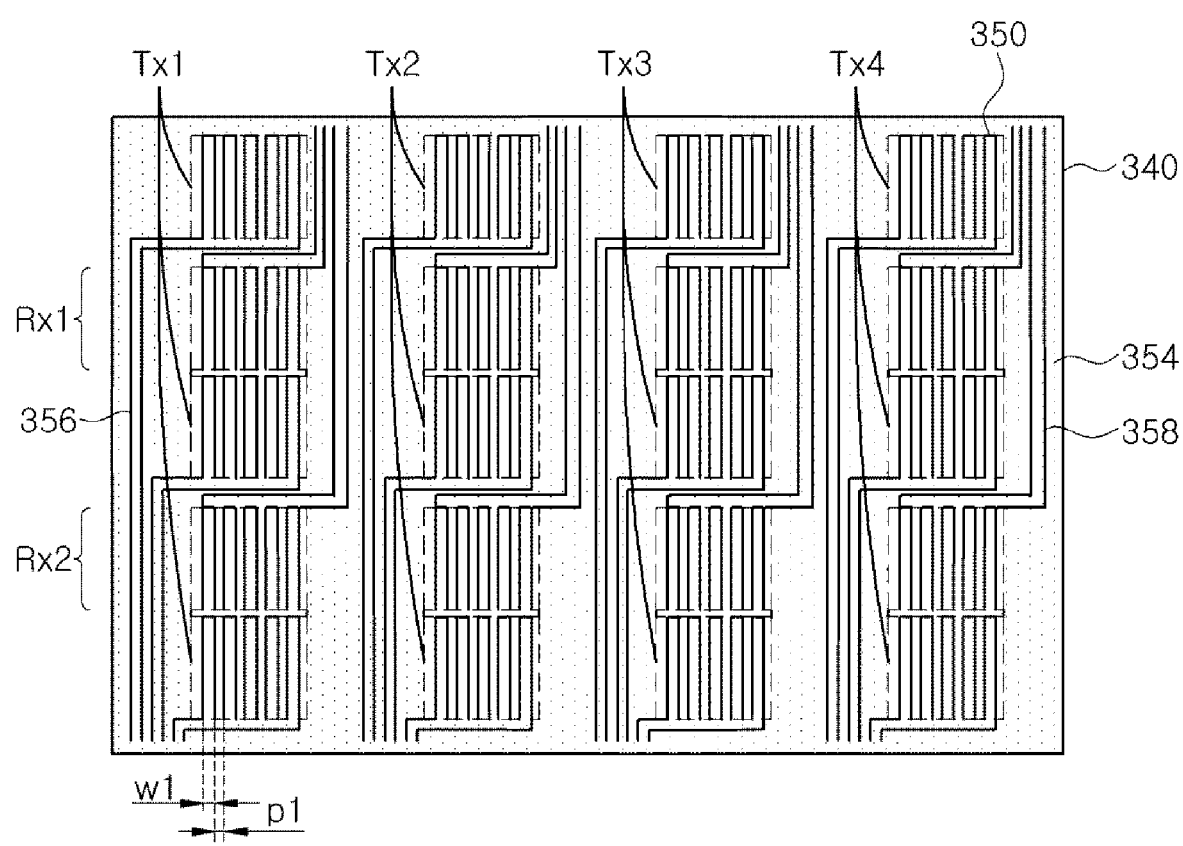
FIG. 6 is a plan view showing a second substrate of a touch display device according to a third aspect of the present disclosure.

FIG. 5 is a cross-sectional view showing a touch display device according to a third aspect of the present disclosure, and FIG. 6 is a plan view showing a second substrate of a touch display device according to a third aspect of the present disclosure. Illustration for a part of the third aspect the same as that of the first and second aspects may be omitted.

In FIGS. 5 and 6, a touch display device 310 includes first and second substrates 320 and 340 facing and spaced apart from each other and a liquid crystal layer 370 between the first and second substrates 320 and 340.

The first substrate 320 includes a pixel P of red, green and blue sub-pixels SPr, SPg and SPb. A pixel electrode 322 and a common electrode 324 spaced apart from each other are formed in each of the red, green and blue sub-pixels SPr, SPg and SPb on an inner surface of the first substrate 320, and a polarizing plate 326 is formed on an outer surface of the first substrate 320.

Although not shown, a gate line and a data line may be formed on the inner surface of the first substrate 320. The gate line and the data line cross each other to define the red, green and blue sub-pixels SPr, SPg and SPb. A thin film transistor connected to the gate line and the data line may be formed in each of the red, green and blue sub-pixels SPr, SPg and SPb. The pixel electrode 322 may be connected to the thin film transistor.

Although the pixel electrode 322 and the common electrode 324 have the same layer and the same material as each other in the third aspect, the pixel electrode and the common electrode may be disposed as different layers with an insulating layer therebetween in another aspect.

A black matrix 354 is formed in a border region between the red, green and blue sub-pixels SPr, SPg and SPb on an inner surface of the second substrate 340. A color filter layer 344 is formed on the black matrix 354 and the inner surface of the second substrate 340, and a color changing layer 346 is formed on the color filter layer 344.

The black matrix 354 corresponds to the gate line and the data line on an inner surface of the first substrate 320 and first and second touch lines 356 and 358 on an inner surface of the second substrate 340.

The color filter layer 344 includes red and green color filter patterns 344a and 344b in the red and green sub-pixels SPr and SPg, respectively. The color changing layer 346 includes red and green color changing patterns 346a and 346b in the red and green sub-pixels, respectively.

The red color filter pattern 344a transmits a red-colored light and blocks a light of different colors. The green color filter pattern 344b transmits a green colored light and blocks a light of different colors.

The red color changing pattern 346a converts a color (a wavelength) of a blue-colored light incident from a lower portion and emits a red-colored light. The green color changing pattern 346b converts a color (a wavelength) of a blue-colored light incident from a lower portion and emits a green-colored light.

For example, the red color changing pattern 346a may convert a blue-colored light having a wavelength of about 430 nm to about 470 nm into a red-colored light having a wavelength of about 650 nm to about 680 nm to emit the red-colored light. The green color changing pattern 346b may convert a blue-colored light having a wavelength of about 430 nm to about 470 nm into a green-colored light having a wavelength of about 540 nm to about 560 nm to emit the green-colored light.

The color changing layer 346 may include a color changing material. For example, the color changing material may include a fluorescent material having a relatively high quantum efficiency such as an organic light emitting material or a quantum dot.

A planarizing layer 348 is formed on the color changing layer 346. Since the planarizing layer 348 is formed in the blue sub-pixel SPb on the inner surface of the second substrate 340 to fill a space between the red and green color changing patterns 346a and 346b, a step difference due to the red and green color changing patterns 346a and 346b is removed and the color changing layer 346 is planarized.

The planarizing layer 348 may include a transparent polymer having a plurality of voids or a plurality of transparent beads to improve a viewing angle by diffusing the green-colored light.

In the third aspect, the color filter pattern and the color changing pattern are not formed in the blue sub-pixel SPb on the inner surface of the second substrate 340 and the planarization layer 348 is formed in the blue sub-pixel SPb on the inner surface of the second substrate 340. In another aspect, the blue color filter pattern and the blue color changing pattern may be formed in the blue sub-pixel SPb on the inner surface of the second substrate 340 and the planarization layer 348 may be omitted in the blue sub-pixel SPb on the inner surface of the second substrate 340.

A wire grid polarizing layer 350 is formed on the planarizing layer 348. The wire grid polarizing layer 350 may include a plurality of groups each having a rectangular shape and a plurality of touch lines connected to the plurality of groups. Each of the plurality of groups may include a plurality of bars parallel to and spaced apart from each other. The plurality of touch lines may include first and second touch lines 356 and 358. The plurality of bars and the first and second touch lines 356 and 358 may include a metallic material such as aluminum (Al), molybdenum (Mo) and tungsten (W).

Specifically, each bar may have a first width w1 and the two adjacent bars may be spaced apart from each other by a first pitch p1. For example, each of the first width w1 and the first pitch p1 may be within a range of about 0.01 μm to about 0.1 μm.

The plurality of groups of the wire grid polarizing layer 350 may be defined as first to fourth transmitting electrodes Tx1 to Tx4 each transmitting a touch transmitting signal and first and second receiving electrodes Rx1 and Rx2 transmitting a touch receiving signal. The first to fourth transmitting electrodes Tx1 to Tx4 and the first and second receiving electrodes Rx1 and Rx2 may be alternately disposed along upper, lower, left and right directions. The first to fourth transmitting electrodes Tx1 to Tx4 may be connected to the first touch line 356, and the first and second receiving electrodes Rx1 and Rx2 may be connected to the second touch line 358.

The wire grid polarizing layer 350 reflects a component (S polarization) of an incident light parallel to a long axis of the plurality of bars and transmits a component (P polarization) of the incident light perpendicular to the long axis of the plurality of bars.

As a result, the wire grid polarizing layer 350 functions as a reflective polarizing element which divides polarization components due to reflection and transmission. Since a reflected light is recycled, a light efficiency increases and a brightness of an image increases.

An overcoat layer 352 is formed on the entire wire grid polarizing layer 350. The overcoat layer 352 may include an organic insulating material such as photoacryl. The overcoat layer 352 may cover the wire grid polarizing layer 350 to protect and planarize the wire grid polarizing layer 350.

A backlight unit 315 supplying a blue-colored light to the touch display panel including the first and second substrates 320 and 340 and the liquid crystal layer 370 is disposed under the first substrate 320.

Although the backlight unit 315 supplies the blue-colored light in the third aspect, a backlight unit 315 may supply a white-colored light and a blue color filter pattern may be formed in the blue sub-pixel SPb on the inner surface of the second substrate 340 in another aspect. When the backlight unit 315 supplying the white-colored light is used, the color changing layer 346 may be omitted.

The touch display device 310 displays an image by realigning the liquid crystal molecule (not shown) of the liquid crystal layer 370 using the electric field generated between the pixel electrode 322 and the common electrode 324.

In addition, the touch display device 310 senses a touch by applying the touch transmitting signal to the first to fourth transmitting electrodes Tx1 to Tx4 of the wire grid polarizing layer 350 and by detecting a capacitance change between the first to fourth transmitting electrodes Tx1 to Tx4 and the first and second receiving electrodes Rx1 and Rx2 due to a touch as the touch receiving signal from the first and second receiving electrodes Rx1 and Rx2 of the wire grid polarizing layer 350.

The touch display device 310 has an in-cell touch type where a touch is sensed using the wire grid polarizing layer 350 functioning as the touch transmitting electrode and the touch receiving electrode on the inner surface of the second substrate 340 adjacent to the touch position. As a result, touch sensitivity is improved, a fabrication cost decreases, and a thickness of the touch display device 310 is reduced.

In addition, since the wire grid polarizing layer 350 on the inner surface of the second substrate 340 has an in-cell polarizing plate type, a fabrication process is simplified and a fabrication cost is reduced.

Further, since the wire grid polarizing layer 350 on the inner surface of the second substrate 340 has a reflective polarizing plate type, an optical efficiency increases and a brightness of an image increases.

Moreover, since the wire grid polarizing layer 350 on the inner surface of the second substrate 340 is used as the touch transmitting electrode and the touch receiving electrode, touch sensitivity is further improved.

In another aspect, a wire grid polarizing plate on an inner surface of a second substrate is divided into groups having a rectangular shape and a touch display device has a self capacitance type.

Figure 7:
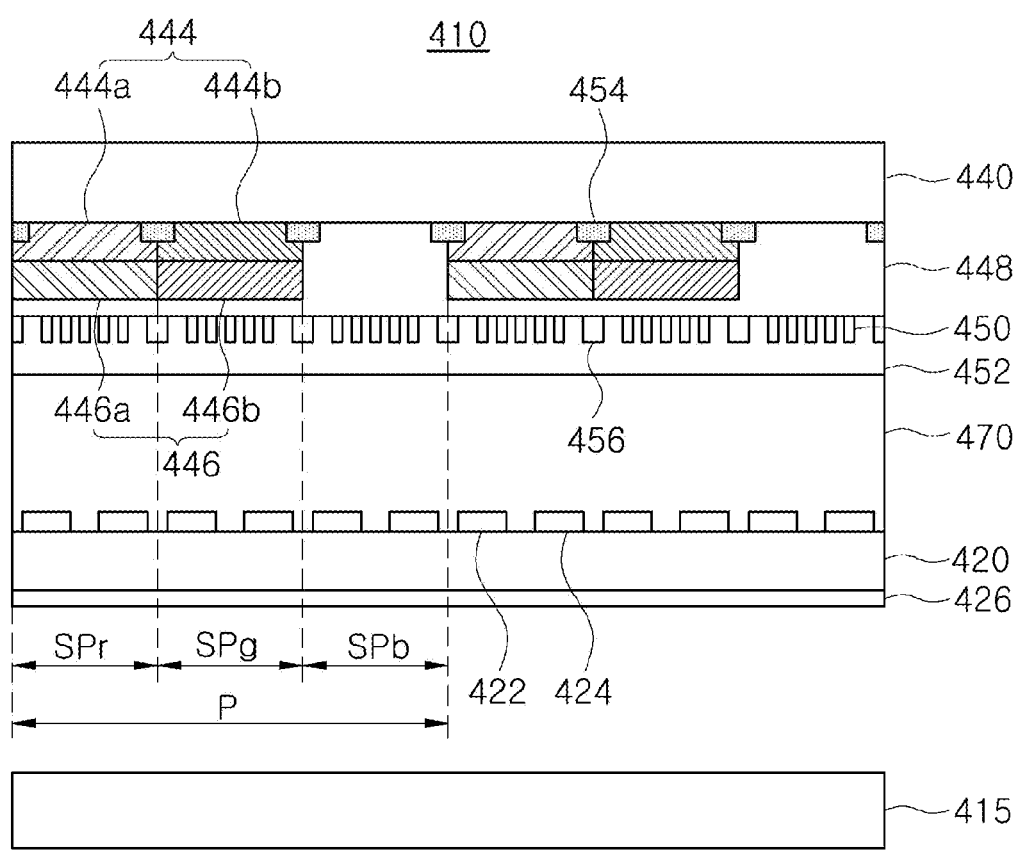
FIG. 7 is a cross-sectional view showing a touch display device according to a fourth aspect of the present disclosure.
Figure 8:
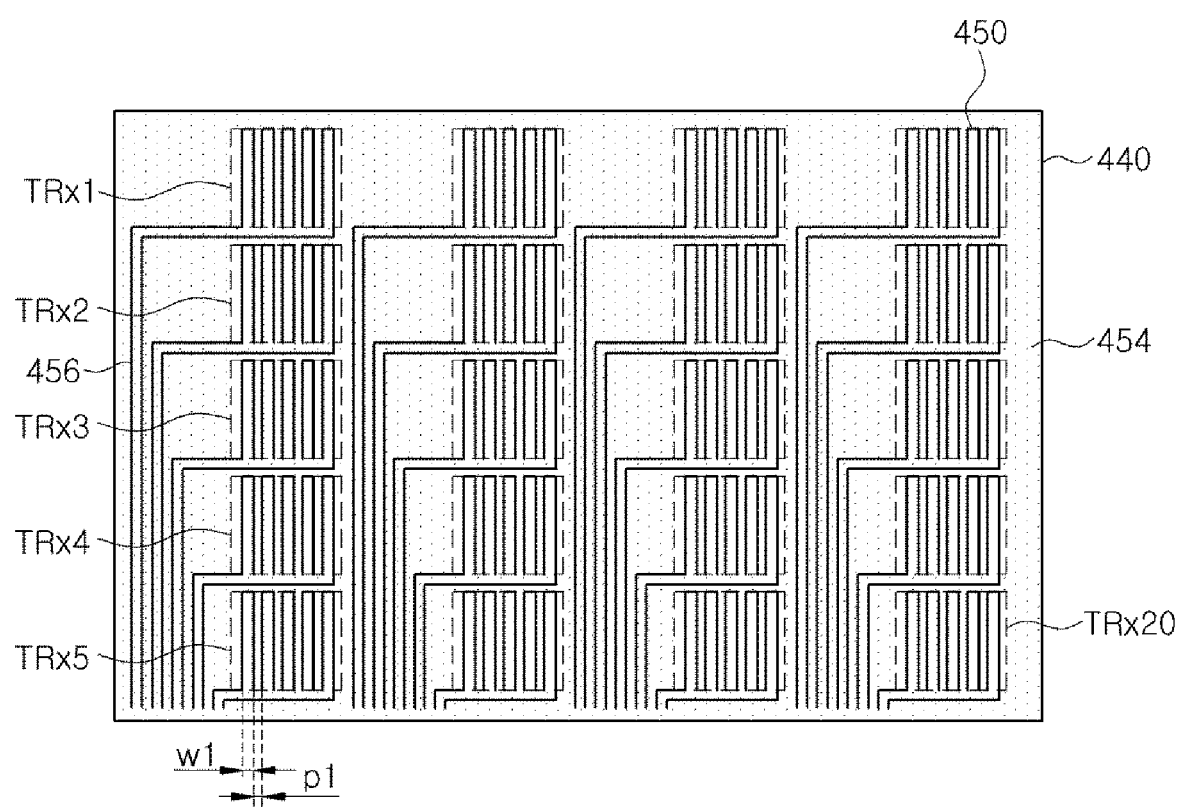
FIG. 8 is a plan view showing a second substrate of a touch display device according to a fourth aspect of the present disclosure.

FIG. 7 is a cross-sectional view showing a touch display device according to a fourth aspect of the present disclosure, and FIG. 8 is a plan view showing a second substrate of a touch display device according to a fourth aspect of the present disclosure. Illustration for a part of the fourth aspect the same as that of the first to third aspects may be omitted.

In FIGS. 7 and 8, a touch display device 410 includes first and second substrates 420 and 440 facing and spaced apart from each other and a liquid crystal layer 470 between the first and second substrates 420 and 440.

The first substrate 420 includes a pixel P of red, green and blue sub-pixels SPr, SPg and SPb. A pixel electrode 422 and a common electrode 424 spaced apart from each other are formed in each of the red, green and blue sub-pixels SPr, SPg and SPb on an inner surface of the first substrate 420, and a polarizing plate 426 is formed on an outer surface of the first substrate 420.

Although not shown, a gate line and a data line may be formed on the inner surface of the first substrate 420. The gate line and the data line cross each other to define the red, green and blue sub-pixels SPr, SPg and SPb. A thin film transistor connected to the gate line and the data line may be formed in each of the red, green and blue sub-pixels SPr, SPg and SPb. The pixel electrode 422 may be connected to the thin film transistor.

Although the pixel electrode 422 and the common electrode 424 have the same layer and the same material as each other in the fourth aspect, the pixel electrode and the common electrode may be disposed as different layers with an insulating layer therebetween in another aspect.

A black matrix 454 is formed in a border region between the red, green and blue sub-pixels SPr, SPg and SPb on an inner surface of the second substrate 440. A color filter layer 444 is formed on the black matrix 454 and the inner surface of the second substrate 440, and a color changing layer 446 is formed on the color filter layer 444.

The black matrix 454 corresponds to the gate line and the data line on an inner surface of the first substrate 420 and a plurality of touch lines 456 on an inner surface of the second substrate 440.

The color filter layer 444 includes red and green color filter patterns 444a and 444b in the red and green sub-pixels SPr and SPg, respectively. The color changing layer 446 includes red and green color changing patterns 446a and 446b in the red and green sub-pixels, respectively.

The red color filter pattern 444a transmits a red-colored light and blocks a light of different colors. The green color filter pattern 444b transmits a green colored light and blocks a light of different colors.

The red color changing pattern 446a converts a color (a wavelength) of a blue-colored light incident from a lower portion and emits a red-colored light. The green color changing pattern 446b converts a color (a wavelength) of a blue-colored light incident from a lower portion and emits a green-colored light.

For example, the red color changing pattern 446a may convert a blue-colored light having a wavelength of about 430 nm to about 470 nm into a red-colored light having a wavelength of about 650 nm to about 680 nm to emit the red-colored light. The green color changing pattern 446b may convert a blue-colored light having a wavelength of about 430 nm to about 470 nm into a green-colored light having a wavelength of about 540 nm to about 560 nm to emit the green-colored light.

The color changing layer 446 may include a color changing material. For example, the color changing material may include a fluorescent material having a relatively high quantum efficiency such as an organic light emitting material or a quantum dot.

A planarizing layer 448 is formed on the color changing layer 446. Since the planarizing layer 448 is formed in the blue sub-pixel SPb on the inner surface of the second substrate 440 to fill a space between the red and green color changing patterns 446a and 446b, a step difference due to the red and green color changing patterns 446a and 446b is removed and the color changing layer 346 is planarized.

The planarizing layer 448 may include a transparent polymer having a plurality of voids or a plurality of transparent beads to improve a viewing angle by diffusing the green-colored light.

In the fourth aspect, the color filter pattern and the color changing pattern are not formed in the blue sub-pixel SPb on the inner surface of the second substrate 440 and the planarization layer 448 is formed in the blue sub-pixel SPb on the inner surface of the second substrate 440. In another aspect, the blue color filter pattern and the blue color changing pattern may be formed in the blue sub-pixel SPb on the inner surface of the second substrate 440 and the planarization layer 448 may be omitted in the blue sub-pixel SPb on the inner surface of the second substrate 440.

A wire grid polarizing layer 450 is formed on the planarizing layer 448. The wire grid polarizing layer 450 may include a plurality of groups each having a rectangular shape and a plurality of touch lines 456 connected to the plurality of groups. Each of the plurality of groups may include a plurality of bars parallel to and spaced apart from each other. The plurality of bars and the plurality of touch lines 456 may include a metallic material such as aluminum (Al), molybdenum (Mo) and tungsten (W).

Specifically, each bar may have a first width w1 and the two adjacent bars may be spaced apart from each other by a first pitch p1. For example, each of the first width w1 and the first pitch p1 may be within a range of about 0.01 µm to about 0.1 µm.

The plurality of groups of the wire grid polarizing layer 450 may be defined as first to twentieth transceiving electrodes TRx1 to TRx20 each transmitting a touch transmitting signal and a touch receiving signal. The first to twentieth transceiving electrodes TRx1 to TRx20 may be alternately disposed along upper, lower, left and right directions.

The wire grid polarizing layer 450 reflects a component (S polarization) of an incident light parallel to a long axis of the plurality of bars and transmits a component (P polarization) of the incident light perpendicular to the long axis of the plurality of bars.

As a result, the wire grid polarizing layer 450 functions as a reflective polarizing element which divides polarization components due to reflection and transmission. Since a reflected light is recycled, a light efficiency increases and a brightness of an image increases.

An overcoat layer 452 is formed on the entire wire grid polarizing layer 450. The overcoat layer 452 may include an organic insulating material such as photoacryl. The overcoat layer 452 may cover the wire grid polarizing layer 450 to protect and planarize the wire grid polarizing layer 450.

Although not shown, a A backlight unit 415 supplying a blue-colored light to the touch display panel including the first and second substrates 420 and 440 and the liquid crystal layer 470 is disposed under the first substrate 420.

Although the backlight unit 415 supplies the blue-colored light in the fourth aspect, a backlight unit 415 may supply a white-colored light and a blue color filter pattern may be formed in the blue sub-pixel SPb on the inner surface of the second substrate 440 in another aspect. When the backlight unit 415 supplying the white-colored light is used, the color changing layer 446 may be omitted.

The touch display device 410 displays an image by realigning the liquid crystal molecule (not shown) of the liquid crystal layer 470 using the electric field generated between the pixel electrode 422 and the common electrode 424.

In addition, the touch display device 410 senses a touch by applying the touch transmitting signal to the first to twentieth transceiving electrodes TRx1 to TRx20 of the wire grid polarizing layer 450 and by detecting a capacitance change between the first to twentieth transceiving electrodes TRx1 to TRx20 due to a touch as the touch receiving signal from the first to twentieth transceiving electrodes TRx1 to TRx20 of the wire grid polarizing layer 450.

The touch display device 410 has an in-cell touch type where a touch is sensed using the wire grid polarizing layer 450 functioning as the touch transmitting electrode and the touch receiving electrode on the inner surface of the second substrate 440 adjacent to the touch position. As a result, touch sensitivity is improved, a fabrication cost decreases, and a thickness of the touch display device 410 is reduced.

In addition, since the wire grid polarizing layer 450 on the inner surface of the second substrate 440 has an in-cell polarizing plate type, a fabrication process is simplified and a fabrication cost is reduced.

Further, since the wire grid polarizing layer 450 on the inner surface of the second substrate 440 has a reflective polarizing plate type, an optical efficiency increases and a brightness of an image increases.

Moreover, since the wire grid polarizing layer 450 on the inner surface of the second substrate 440 is used as the touch transceiving electrode, touch sensitivity is further improved.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A touch display device, comprising:
   first and second substrates facing each other and including red, green and blue sub-pixels;
   a polarizing layer on an outer surface of the first substrate;
   a pixel electrode and a common electrode in each of the red, green and blue sub-pixels on an inner surface of the first substrate, the pixel electrode and the common electrode having a same layer and a same material;
   a color filter layer on an inner surface of the second substrate;
   a touch receiving electrode between the second substrate and the color filter layer and having a bar shape;
   a wire grid polarizing layer on the color filter layer, the wire grid polarizing layer including a plurality of bars, and a touch signal applied to the wire grid polarizing layer;
   a liquid crystal layer between the first and second substrates; and
   a backlight unit disposed in close proximity to the first substrate,
   wherein the touch receiving electrode is defined and functions as a plurality of receiving electrodes, and each of the plurality of receiving electrodes has a width corresponding to at least one of the red, green and blue sub-pixels,
   wherein the wire grid polarizing layer is defined and functions as a plurality of transmitting electrodes, and each of the plurality of transmitting electrodes has a width corresponding to at least one of the red, green and blue sub-pixels,
   wherein the plurality of bars are spaced apart from each other by a first pitch, and each of the plurality of bars has a width that is the same as the first pitch,
   wherein the plurality of transmitting electrodes are spaced apart from each other by a second pitch greater than the first pitch, and no bar is disposed between two adjacent transmitting electrodes defining the second pitch,
   wherein the touch receiving electrode is disposed on the inner surface of the second substrate facing the color filter layer, and the color filter layer is disposed between the touch receiving electrode and the wire grid polarizing layer,
   wherein one of the red, green and blue sub-pixels has a space that is filled with a planarizing layer without the color filter layer and the planarizing layer contacts both of the touch receiving electrode and the wire grid polarizing layer,
   wherein the backlight unit emits a blue-colored light, wherein the color filter layer includes red and green color filter patterns corresponding to the red and green sub-pixels, respectively, wherein a color changing layer includes red and green color changing patterns corresponding to the red and green sub-pixels, respectively, and wherein the space is located in the blue sub-pixel.

2. The device of claim 1, further comprising:

a color changing layer between the color filter layer and the wire grid polarizing layer; and an overcoat layer between the wire grid polarizing layer and the liquid crystal layer.

3. The device of claim 1, wherein each of the plurality of receiving electrodes transmits a touch receiving signal, wherein each of the plurality of transmitting electrodes transmits a touch transmitting signal, and wherein the plurality of receiving electrodes and the plurality of transmitting electrodes cross each other.

4. The device of claim 1, wherein each of the plurality of bars has a first width within a range of 0.01 μm to 0.1 μm, and the plurality of bars are spaced apart from each other by a first pitch within a range of 0.01 μm to 0.1 μm.

5. A touch display device having first and second substrates facing each other, comprising:

red, green and blue sub-pixels on an inner surface of the first substrate;

a polarizing layer on an outer surface of the first substrate;

a pixel electrode and a common electrode at each of the red, green and blue sub-pixels on an inner surface of the first substrate, the pixel electrode and the common electrode having a same layer and a same material;

a color filter layer on an inner surface of the second substrate;

a touch receiving electrode between the second substrate and the color filter layer and having a bar shape;

a wire grid polarizing layer on the color filter layer and receiving a touch signal to function as a touch electrode and an in-cell polarizing plate, the wire grid polarizing layer including a plurality of bars;

a liquid crystal layer between the first and second substrates; and a backlight unit disposed in close proximity to the first substrate, wherein the touch receiving electrode is defined and functions as a plurality of receiving electrodes, and each of the plurality of receiving electrodes has a width corresponding to at least one of the red, green and blue sub-pixels, wherein the wire grid polarizing layer is defined and functions as a plurality of transmitting electrodes, and each of the plurality of transmitting electrodes has a width corresponding to at least one of the red, green and blue sub-pixels, wherein the plurality of bars are spaced apart from each other by a first pitch, and each of the plurality of bars has a width that is the same as the first pitch, wherein the plurality of transmitting electrodes are spaced apart from each other by a second pitch greater than the first pitch, and no bar is disposed between two adjacent transmitting electrodes defining the second pitch, wherein the touch receiving electrode is disposed on the inner surface of the second substrate facing the color filter layer, and the color filter layer is disposed between the touch receiving electrode and the wire grid polarizing layer, wherein one of the red, green and blue sub-pixels has a space that is filled with a planarizing layer without the color filter layer and the planarizing layer contacts both of the touch receiving electrode and the wire grid polarizing layer, wherein the backlight unit emits a blue-colored light, wherein the color filter layer includes red and green color filter patterns corresponding to the red and green sub-pixels, respectively, wherein a color changing layer includes red and green color changing patterns corresponding to the red and green sub-pixels, respectively, and wherein the space is located in the blue sub-pixel.

6. The device of claim 5, further comprising:

a color changing layer between the color filter layer and the wire grid polarizing layer; and an overcoat layer between the wire grid polarizing layer and the liquid crystal layer.

7. The device of claim 5, wherein each of the plurality of receiving electrodes transmits a touch receiving signal, wherein each of the plurality of transmitting electrodes transmits a touch transmitting signal, and wherein the plurality of receiving electrodes and the plurality of transmitting electrodes cross each other.

8. A method of fabricating a touch display device, comprising:

forming a pixel electrode and a common electrode in each of red, green and blue sub-pixels on a first substrate, the pixel electrode and the common electrode having a same layer and a same material;

forming a color filter layer on a second substrate;

forming a touch receiving electrode between the second substrate and the color filter layer and having a bar shape;

forming a wire grid polarizing layer on the color filter layer, the wire grid polarizing layer including a plurality of bars and a touch signal applied to the wire grid polarizing layer;

forming a planarizing layer between the color filter layer and the wire grid polarizing layer;

attaching the first and second substrates with each other;

forming a liquid crystal layer between the first and second substrates;

forming a polarizing layer on an outer surface of the first substrate; and disposing a backlight unit in close proximity to the first substrate, wherein the touch receiving electrode is defined and functions as a plurality of receiving electrodes, and each of the plurality of receiving electrodes has a width corresponding to at least one of the red, green and blue sub-pixels, wherein the wire grid polarizing layer is defined and functions as a plurality of transmitting electrodes, and each of the plurality of transmitting electrodes has a width corresponding to one of the red, green and blue sub-pixels, wherein the plurality of bars are spaced apart from each other by a first pitch, and each of the plurality of bars has a width that is the same as the first pitch, wherein the plurality of transmitting electrodes are spaced apart from each other by a second pitch greater than the first pitch, and no bar is disposed between two adjacent transmitting electrodes defining the second pitch, wherein the touch receiving electrode is disposed on an inner surface of the second substrate facing the color filter layer, and the color filter layer is disposed between the touch receiving electrode and the wire grid polarizing layer, wherein one of the red, green and blue sub-pixels has a space that is filled with the planarizing layer without the color filter layer and the planarizing layer contacts both of the touch receiving electrode and the wire grid polarizing layer, wherein the backlight unit emits a blue-colored light, wherein the color filter layer includes red and green color filter patterns corresponding to the red and green sub-pixels, respectively, wherein a color changing layer includes red and green color changing patterns corresponding to the red and green sub-pixels, respectively, and wherein the space is located in the blue sub-pixel.

9. The method of claim 8, further comprising:

forming a color changing layer between the color filter layer and the wire grid polarizing layer; and forming an overcoat layer between the wire grid polarizing layer and the liquid crystal layer.

\* \* \* \* \*